US005472543A

United States Patent [19]

Yokajity

[11] Patent Number: 5,472,543

[45] Date of Patent: Dec. 5, 1995

[54] METHOD FOR LABEL APPLICATION USING BERNOULLI EFFECT

[75] Inventor: Joseph E. Yokajity, Rochester, N.Y.

[73] Assignee: Eastman Kodak Company, Rochester, N.Y.

[21] Appl. No.: 144,965

[22] Filed: Oct. 28, 1993

Related U.S. Application Data

[62] Division of Ser. No. 923,702, Jul. 31, 1992.

[51] Int. Cl.⁶ .......... B32B 1/00

[52] U.S. Cl. .......... 156/249; 156/285; 156/344

[58] Field of Search .......... 156/DIG. 38, DIG. 31, 156/542, 230, 249, 285, 344; 406/10; 269/20, 21, 303; 271/98, 183; 294/64.1, 64.2, 64.3

[56] References Cited

U.S. PATENT DOCUMENTS

| | | | |
|---|---|---|---|
| 3,206,347 | 9/1965 | Holstein | 156/476 |
| 3,340,795 | 9/1967 | Hartley | 100/154 |
| 3,466,079 | 9/1969 | Mammel | 294/64 X |
| 3,483,059 | 12/1969 | Dinter | 156/364 |
| 3,523,706 | 8/1970 | Logue | 294/64 X |
| 3,539,216 | 11/1970 | Fercier | 294/64 X |
| 3,614,168 | 10/1971 | Range | 302/31 |
| 3,645,832 | 2/1972 | Sauer | 156/541 |
| 3,885,705 | 5/1975 | French | 221/211 |
| 3,888,725 | 6/1975 | French | 156/556 |
| 3,918,334 | 11/1975 | Wilcox | 83/13 |
| 3,976,330 | 8/1976 | Babinski et al. | 302/2 |
| 3,984,277 | 10/1976 | French et al. | 156/497 |
| 4,029,351 | 7/1977 | Argar | 294/64 B X |
| 4,046,613 | 9/1977 | Kucheck | 156/249 X |
| 4,165,132 | 8/1979 | Hassan et al. | 406/10 |
| 4,210,484 | 7/1980 | Crankshaw | 156/542 X |
| 4,255,220 | 3/1981 | Kucheck | 156/285 X |
| 4,257,637 | 3/1981 | Hassan et al. | 294/64 |
| 4,295,915 | 10/1981 | Sakaguchi | 156/361 X |
| 4,324,608 | 8/1982 | Klinger | 156/542 X |
| 4,367,118 | 1/1983 | Karp | 156/542 X |
| 4,390,386 | 6/1983 | Bartl | 156/235 X |
| 4,392,913 | 7/1983 | Baumli | 156/584 X |
| 4,395,165 | 7/1983 | DeRobertis et al. | 406/88 |
| 4,419,704 | 12/1983 | Radman | 360/102 |

(List continued on next page.)

FOREIGN PATENT DOCUMENTS

| | | | |
|---|---|---|---|
| 61-254437 | 12/1986 | Japan . | |
| 402338245 | 10/1991 | Japan | 294/64.3 |
| WO89/12907 | 12/1989 | WIPO | H01J 37/20 |

OTHER PUBLICATIONS

IBM Technical Disclosure Bulletin—"Document Transport"—R. K. Wilmer, vol. 7, No. 10, Mar. 1962.

IBM Technical Disclosure Bulletin—"Self Centering Non-Contact Pick Up", R. D. Coles, vol. 22, No. 8A, Jan. 1980.

*Primary Examiner*—David A. Simmons
*Attorney, Agent, or Firm*—Charles E. Snee, III

[57] ABSTRACT

A labeller head using the Bernoulli Effect is suited for applying thin, flexible, pressure sensitive labels (14, 106) of the type having a first, display side and a second, adhesive side, and includes a body having a rigid or resilient support surface (52, 64, 102, 104); a plenum (54) within the body; a plurality of bores (56, 74, 86–90, 114) extending from the plenum through the support surface, the bores being angled with respect to the support surface and arranged in an array so that jets of gas issuing from the array will cause the label to be drawn onto the support surface when the label is presented to the support surface and the first, display side is brought into close proximity of the jets, thereby causing a zone of reduced gas pressure to be formed between the support surface and the first, display side and establishing a pressure differential across the label to hold the label on a film of gas flowing over the support surface; a source of pressurized gas (58) for directing gas into the plenum and through the angled bores; and stops (60, 66, 76, 108–112) for stopping movement of the label relative to the support surface, each of the jets of gas issuing from the support surface being directed at least partially toward the stops. A corresponding method for applying a label is taught.

5 Claims, 10 Drawing Sheets

U.S. PATENT DOCUMENTS

| | | | |
|---|---|---|---|
| 4,474,397 | 10/1984 | Hassan | 294/64 B X |
| 4,556,443 | 12/1985 | Moya | 156/356 |
| 4,561,921 | 12/1985 | Treiber | 156/542 X |
| 4,577,854 | 3/1986 | Bachmann et al. | 271/227 |
| 4,581,094 | 4/1986 | Sato | 156/352 |
| 4,595,447 | 6/1986 | Lindstrom | 156/364 X |
| 4,680,082 | 7/1987 | Kearney | 156/497 |
| 4,707,211 | 11/1987 | Shibata | 156/354 |
| 4,822,442 | 4/1989 | Ashcroft | 156/361 X |
| 4,865,491 | 9/1989 | Sakurai | 406/87 |
| 4,919,747 | 4/1990 | Eagle | 156/497 |
| 5,009,741 | 4/1991 | Focke et al. | 156/483 |
| 5,012,463 | 4/1991 | Farnsworth et al. | 369/100 |
| 5,056,431 | 10/1991 | Sainio | 101/219 |
| 5,080,549 | 1/1992 | Goodwin et al. | 414/744.8 |
| 5,126,753 | 6/1992 | Martin et al. | 346/1.1 |
| 5,169,196 | 12/1992 | Safabaksu | 294/64.3 X |
| 5,232,540 | 8/1993 | Southwell | 156/361 X |
| 5,255,020 | 10/1993 | Martin et al. | 346/140 R |

METHOD FOR LABEL APPLICATION USING BERNOULLI EFFECT

This is a divisional of application Ser. No. 923,702, filed Jul. 31 1992, pending.

DESCRIPTION

The invention concerns apparatus and methods for applying labels to articles. More particularly, the invention is related to use of the Bernoulli Effect in labelling apparatus and methods to provide quick, accurate placement of pressure-sensitive, adhesive-backed labels or precut pieces of adhesive tape.

BACKGROUND ART

Apparatus and methods are known for applying pressure-sensitive labels to a wide variety of articles. Most commonly in recent years, such labels have been supplied in the manner shown in FIGS. 1 and 2. An elongated carrier strip 10 having a centerline 12 is provided on one side with a surface having low affinity for the adhesive-backed side of a plurality of pressure-sensitive labels 14 whose display sides face outward from carrier strip 10. Labels 14 may be of practically any shape and are made of a moderately stiff material such as paper, to facilitate their ready removal from carrier strip 10, either by hand or by apparatus of the general types shown in FIGS. 3 to 5. In some instances, such as to provide tamper proof packaging for certain products, labels 14 may be provided with radially extending features such as outwardly extending tabs or arms 16 which can be folded over the sides of a cap on the article to prevent removal of the cap without destroying the tab.

Typically, such carrier strips and labels are wound into large rolls, though flat strips are also used. As shown schematically in FIG. 3, such a roll 18 is mounted for rotation so that strip 10, 12, 14 can be pulled around an idler roller 20 and then around the edge of a peeler plate 22. Because the adhesive backing on labels 14 has a low affinity for the surface of strip 10 and because labels 14 have a certain stiffness, the labels will release gradually and automatically from strip 10 as the strip passes around the edge of the peeler plate and will be presented essentially tangentially to the labeller head. Most commonly, the labels are applied directly to the article to be labelled as the labels leave the peeler plate, after which the labels may be tamped in place in the familiar manner. Another known apparatus for acquiring the label upon release is a reciprocating vacuum labeller head 24, whose undersurface is provide with ports connected to a source of subatmospheric pressure; so that, the label is sucked onto labeller head 24. Convenient to labeller head 24 is a conveyor or product nest 26 on which an article to be labelled is presented. The labeller head is then pressed against the article to apply the label and, in some instances, the vacuum is released and pressurized air is applied to push the label onto the article. From peeler plate 22, strip 10, 12 passes over a driven roller 30 and is rewound onto a roll 32.

FIG. 4 shows schematically yet another known type of labeller apparatus in which reciprocating labeller head 24 has been replaced by a rotating wheel or drum 34 whose periphery is provided with a plurality of circumferentially spaced vacuum ports or heads which move on a predetermined path to pull labels 14 one by one from strip 10, 12 and roll the labels onto articles 28 moving past on conveyor 26. Yet another known type of labeller apparatus, shown schematically in FIG. 5, is a sort of carousel 36 comprising an upper annular frame 38 and a plurality of vacuum heads 40 supported on frame 38 for reciprocation up and down by conventional means. A lower base 42 receives articles 28 from an adjacent feed wheel 44 and positions the articles below vacuum heads 40. As carousel 36 rotates, labels are fed to the vacuum heads moving along a predetermined path past peeler plate 22, after which the vacuum heads are lowered to press the labels against articles 28, which are then removed from base 42 by a discharge wheel 46.

In each of the known apparatus just mentioned, and also in the known apparatus shown schematically in FIGS. 22 to 24, several factors can prevent or considerably complicate accurate application of label 14 to article 28. As shown in FIGS. 1 and 2, the labels may not be centered relative to centerline 12 of strip 10; so that, they arrive at the vacuum labeller heads out of position for accurate application. The width of carrier strip 10 may vary from one roll 18 to another, which means that even if strip 10 is accurately guided at one edge across peeler plate 22, the transverse position of the labels reaching the vacuum labeller heads will vary from roll to roll. The strip 10, 12, 14 may in some labellers tend to wander or jitter transversely back and forth somewhat on peeler plate 22, causing the positions of successive labels to vary. Also, variations in the longitudinal position of the labels may be caused by typical variability in the label feed motor and in the take-up motor for the carrier strip, particularly when the labels are applied directly. Variations in the adhesive of the labels and in the vacuum applied can influence the position of the labels on the vacuum heads. Thus, a need has existed for an apparatus for applying such labels which can accommodate such malpositioning factors and still apply the labels quickly and with great accuracy to articles.

SUMMARY OF THE INVENTION

The apparatus of the invention is especially suited for acquiring and holding a thin, flexible, pressure sensitive label of the type having a first, display side and a second, adhesive side opposite said first, display side. The apparatus comprises a body having a support surface which may be fiat, or convex and substantially cylindrical with an axis of curvature. A plenum within the body communicates with a plurality of bores extending from the plenum through the support surface, the bores being angled with respect to the support surface and arranged in an array so that jets of gas issuing from the array will cause a label to be drawn onto the support surface when the label is presented to the support surface and the first, display side is brought into close proximity of the jets, thereby causing a zone of reduced gas pressure to be formed between the support surface and the first, display side and establishing a pressure differential across the label to hold the label on a film of gas flowing over the support surface. Means are provided for directing a flow of gas into the plenum and through the angled bores. Optionally, means may be provided for presenting at least a portion of the label opposite the support surface to permit the jets to engage the first, display side and draw the label onto the support surface. Optionally, a further plenum may be provided within the body in communication with the support surface by further bores through which higher pressure air may be passed to blow the labels onto the articles to be labelled. Means are provided for stopping movement of the label relative to the support surface, each of the jets of gas issuing from the support surface being oriented at least partially toward the means for stopping.

In one embodiment of the invention, the body is resilient at the support surface and further comprises means for moving the support surface into close proximity with an article to be labelled, thereby pressing the second, adhesive side against the article to apply the label. In a preferred embodiment, the means for presenting moves the labels toward the means for stopping. The means for presenting may comprise an elongated carrier strip on which a plurality of the labels are arranged in a linear pattern with the first, display side facing outwards; a peeler member about which the carrier strip is wrapped with the labels facing outwards; and means for moving the carrier strip past the peeler member to cause successive labels to peel away or release from the carrier strip and move across the support surface.

In another embodiment, the array is essentially circular and the jets of gas are directed around the array, whereby the label rotates on the film of gas until engaged by the means for stopping. The label may be provided with a radially inwardly or outwardly extending feature which is engaged by the means for stopping. The label may comprise a central aperture; and the body may comprise a locator pin positioned centrally of the array, the pin being sized to pass through the aperture of the label and preferably being retractable. Means may be provided for moving the body from a first position at which each label is presented to the support surface, to a second position; and conveyor means may be provided for presenting to the body at the second position a plurality of articles for receiving labels.

The body may comprise a plurality of the support surfaces and the apparatus further may comprise means for moving the plurality of support surfaces along a predetermined path. In such embodiment, the labels are presented one by one to the plurality of support surfaces whereby the labels are carried away along the path; and means are provided for presenting articles for receiving the labels. In another embodiment, the body may comprise a pair of pivotably mounted support members, a first portion of the support surface being on one of the support members and a second portion of the support surface being on the other of the support members, each of the portions comprising part of the array, whereby the label is held in position on both of the portions of the support surface; and means are provided for moving an article into contact with the adhesive side and between the pivotably mounted support members, whereby the support members pivot as the article moves therebetween to wrap the label at least partially around the article.

The method of the invention is well suited for applying to an article a thin, flexible, pressure sensitive label of the type having a first, display side and a second, adhesive side opposite said first, display side. The method comprises the steps of providing a Bernoulli Effect pickup device of the known type including a surface with a plurality of bores opened through the support surface and arranged in array so that jets of gas issuing from the array can cause one of the labels to be supported the support surface on a thin film of gas flowing between the support surface and the first, display side; placing one of the labels on the pickup device with the first, display side facing the support surface; optionally applying vacuum through the support surface to initially hold the label; directing gas through the bores to form the jets and to reposition and support the label; optionally applying vacuum to hold the label in position; and moving the pickup device into close proximity to the article, thereby pressing the second, adhesive side against the article to apply the label. The directing step may take place before the placing step. The method may further comprise the step of applying a further flow of air through other bores in the support surface to blow the second, adhesive side into contact with the article. The method may also comprise the steps, after the directing step, of applying vacuum to the bores to hold the label to the support surface; and then applying pressurized gas to the bores to blow the label against the article.

BRIEF DESCRIPTION OF THE DRAWINGS

The foregoing and other objectives, features and advantages of the invention will be apparent from the following more particular description of the preferred embodiments of the invention, as illustrated in the accompanying drawings.

DESCRIPTION OF THE PREFERRED EMBODIMENTS

Figure 1:
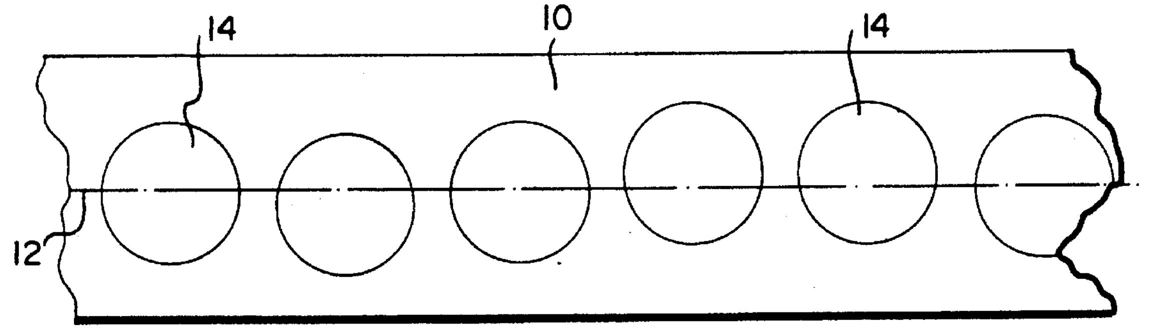
FIG. 1 PRIOR ART
FIG. 1 shows a plan view of a segment of a carder strip supporting a plurality of labels.
Figure 2:
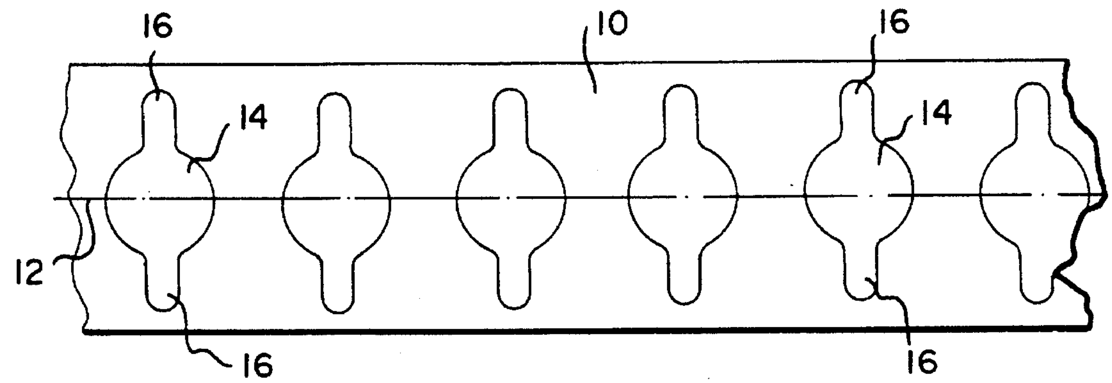
FIG. 2 PRIOR ART
FIG. 2 shows a plan view of a carder strip supporting a plurality of differently shaped labels.

The following is a detailed description of the preferred embodiments of the invention, reference being made to the drawings in which the same reference numerals identify the same elements of structure in each of the several Figures.

Figure 3:
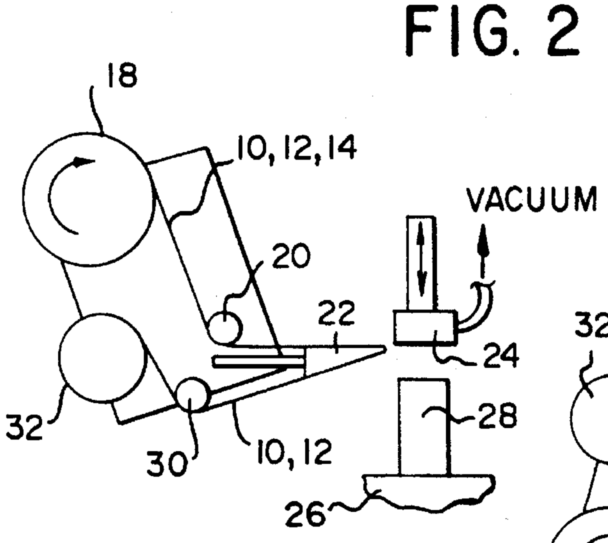
FIG. 3 PRIOR ART
FIG. 3 shows schematically one known type of labeller apparatus with a reciprocating labeller head.
Figure 4:
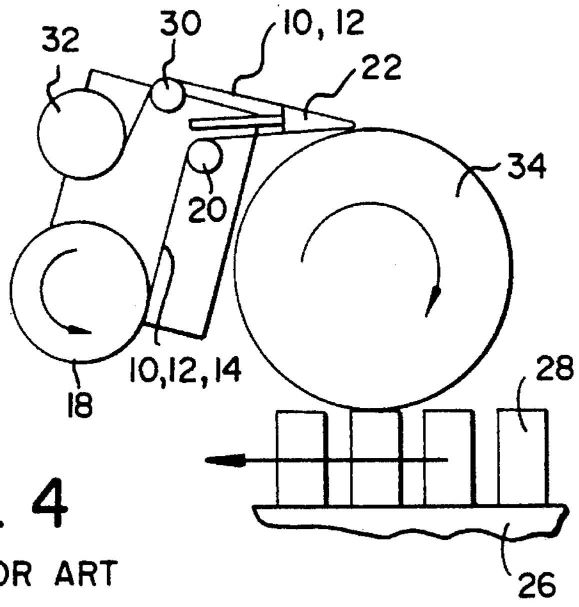
FIG. 4 PRIOR ART
FIG. 4 shows schematically another known type of labeller apparatus with a rotating drum supporting a plurality of labeller heads.
Figure 5:
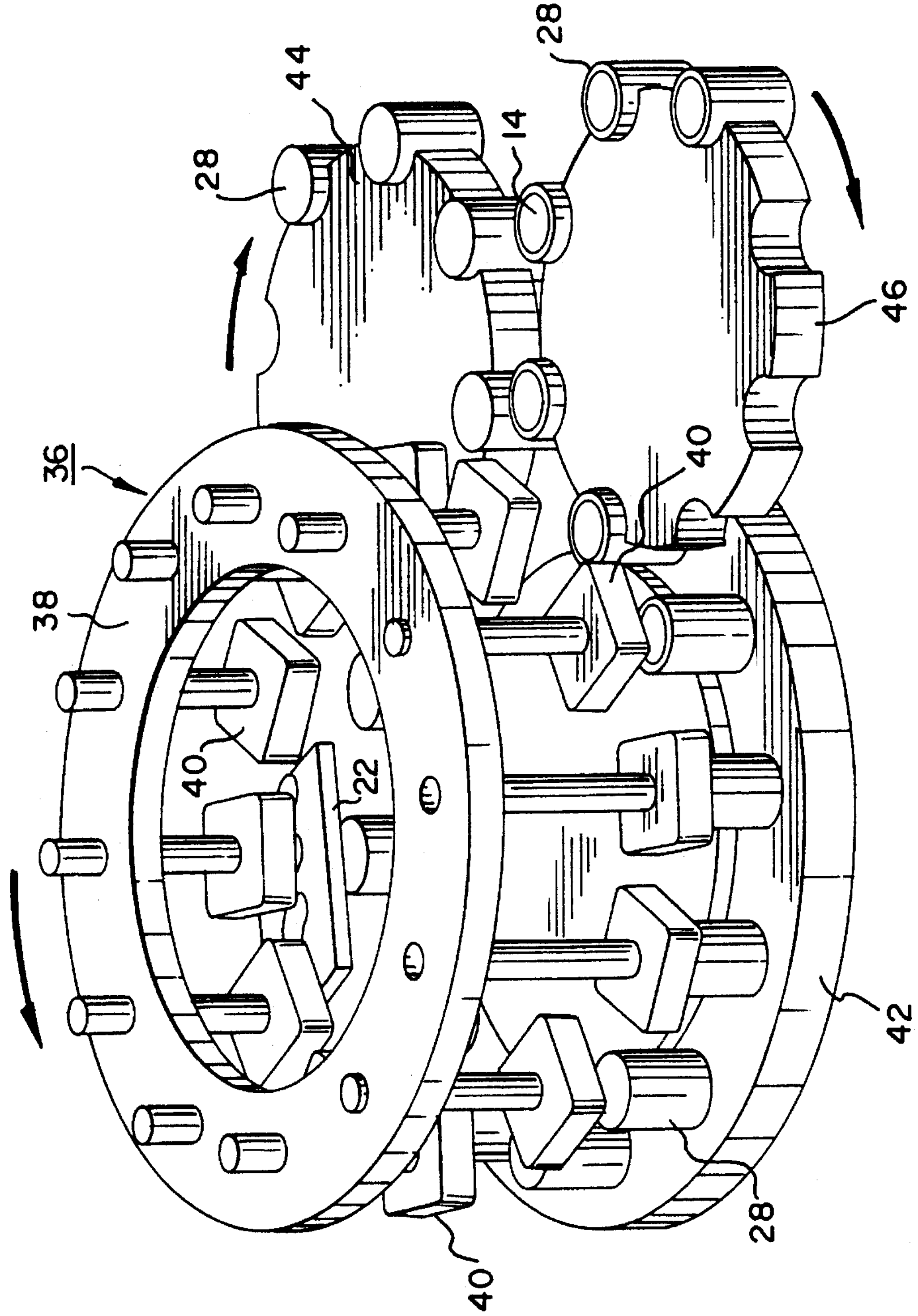
FIG. 5 PRIOR ART
FIG. 5 shows schematically another known type of labeller apparatus with a carousel supporting a plurality of labeller heads.
Figure 7:
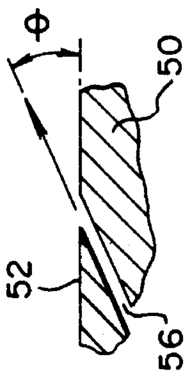
FIG. 7 shows a fragmentary sectional view of the labeller head of FIG. 6, indicating the orientation of the bores for the gas jets.
Figure 6:
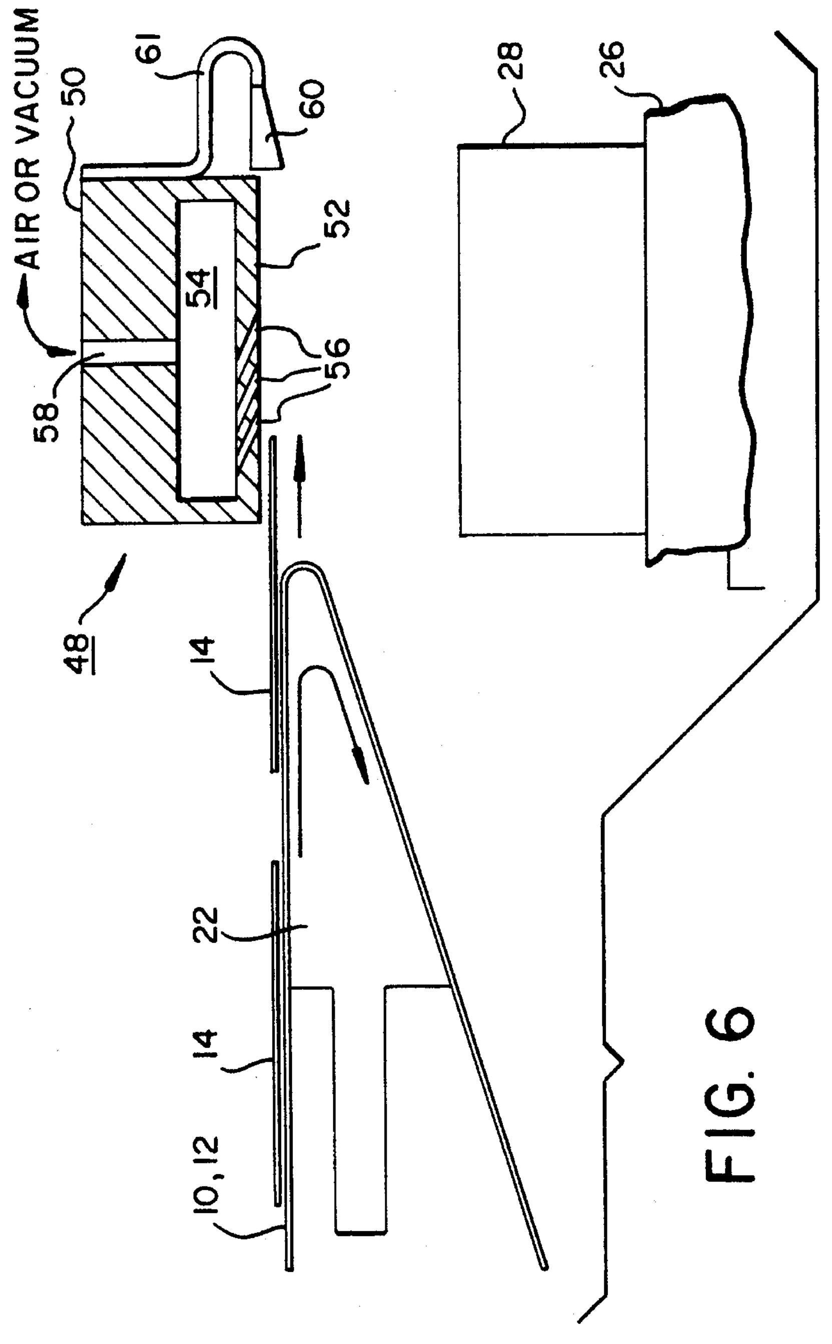
FIG. 6 shows schematically a first embodiment of the labeller head according to the invention.

FIGS. 6 and 7 illustrate a first embodiment of the Bernoulli Effect labeller head 48 according to the invention which is useful in the apparatus of FIGS. 3 to 5. Applicant has discovered that the well known Bernoulli Effect can be used in such a way in a labeller head that malpositioning factors of the type previously described can be accommodated by precisely repositioning the label once it has been released from the carder strip to the labeller head. A body 50 of suitable material such as metal or rigid plastic or a resilient material is provided with a smooth, typically flat support surface 52. Within body 50, a plenum 54 communicates with a plurality of bores 56 which extend from plenum 50 to support surface 52. Preferably, bores 56 have a diameter in the range of 0.012 to 0.032 inch (0.030 to 0.081 cm) and are set at an angle θ to support surface 52 in the range of 5 to 45 degrees. A port 58 is provided through body 50 to connect plenum 54 to a source of pressurized air or, in some applications, also to a source of subatmospheric pressure. As will be discussed subsequently, bores 56 are arranged in an array so that jets of gas issuing from the bores will cause label 14 to be drawn onto support surface 52 when the label is presented to the support surface and its display side is brought into close proximity with the jets of gas. The flow of gas causes a zone of reduced gas pressure to be formed between support surface 52 and label 14, in accordance with the Bernoulli Effect, thereby establishing a pressure differential across the label to hold the label in position on a film of gas flowing over the support surface. The array is also configured in each embodiment of the invention so that, once released, label 14 will move relative to support surface 52 and reposition itself accurately against one or more stops 60 provided on or adjacent the support surface. Just as shown in FIGS. 6, 13 to 21, 25 and 26, in the embodiment of FIGS. 6 to 12 label 14 covers the portion of the array of bores 56 which are at least partially directed toward stops 60, when the label is positioned against the stops. Thus, the rear or upstream edge of the label is not subjected to air flows which could dislodge it from its position against the stops. In this embodiment, stops 60 may be supported on resilient springs 61, which allow the stops to be depressed to the level of support surface 52 during label application. Preferably, stops 60 are made from a material to which the adhesive of the labels will not stick readily, such as Rulon, a plastic material made by Dixon Industries Corp. of Bristol, R.I. U.S.A. Thus, the label can be accurately applied to an article even if the label, when presented to labeller head 48, was subject to one or more of the malpositioning factors previously described.

Figure 8:
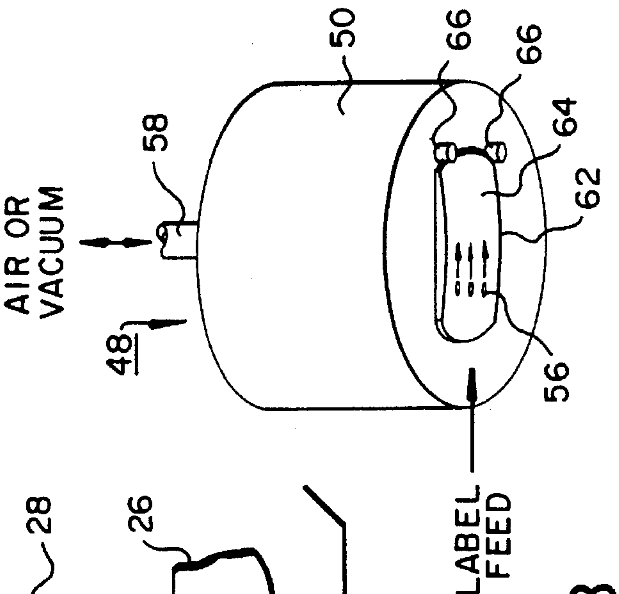
FIG. 8 shows a perspective view of a second embodiment of the labeller head according to the invention.
Figure 9:
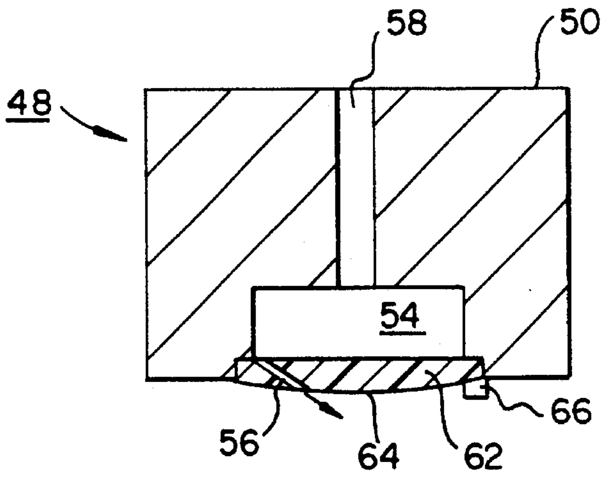
FIG. 9 shows an elevation section view through the labeller head of FIG. 8.

FIGS. 8 and 9 illustrate a second embodiment of the invention, also useful in the apparatus of FIGS. 3 to 5, in which flat support surface 52 has been replaced by a resilient insert 62 of a material such as silicon rubber which has cylindrical, convex support surface 64 having an axis of curvature transverse to the direction from which label 14 is fed to labeller head 48. A pair of stop pins or abutments 66 are provided on one side of support surface 64. Stop pins 66 preferably also are made from a non-stick material such as Rulon. Preferably, at least a portion of bores 56 are angled so that their jets of gas are directed at least partially toward stop pins 66 and do not oppose movement of label 14 onto the labeller head. By "at least partially toward" is meant that none of the air jets includes a vector component which would oppose movement of the label across support surface 64. For round labels, the jets from bores 56 preferably are symmetrically placed on either side of the path of the label onto the labeller head. Round labels upon release will move across support surface 64 into accurate engagement with stop pins 66. As discussed with regard to FIGS. 25 and 26, non-symmetric arrays of bores are also useful, for example, with rectangular labels. The resilient material of insert 62 and the cylindrical shape of support surface 64 ensure that when the labeller head is pressed against an article to apply label 14, essentially line contact is first established due to the cylindrical shape and then the insert compresses, so that the label is smoothly applied without bubbles or wrinkles.

Figure 10:
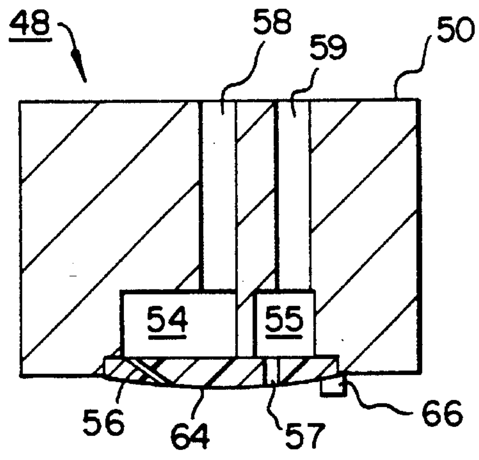
FIG. 10 shows an elevation view of a third embodiment of the labeller head.

FIG. 10 shows a third embodiment of the labeller head of FIGS. 8 and 9. Within body 50, a second plenum 55 communicates with one or more bores 57 which extend from plenum 55 to support surface 64. Such a second plenum and bores also may be included in the other embodiments of the invention, though not specifically illustrated for each of them. A port 59 is provided from plenum 55 to a source of pressurized air;, so that, a blast of air through bores 57 may be used to blow the label onto the article to be labelled.

Figure 11:
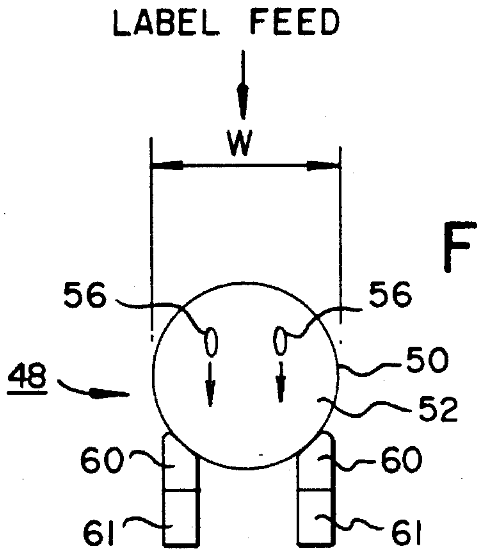
FIGS. 11 and 12 show a plan views of alternative versions of the labeller heads of FIGS. 6 to 10.
Figure 12:
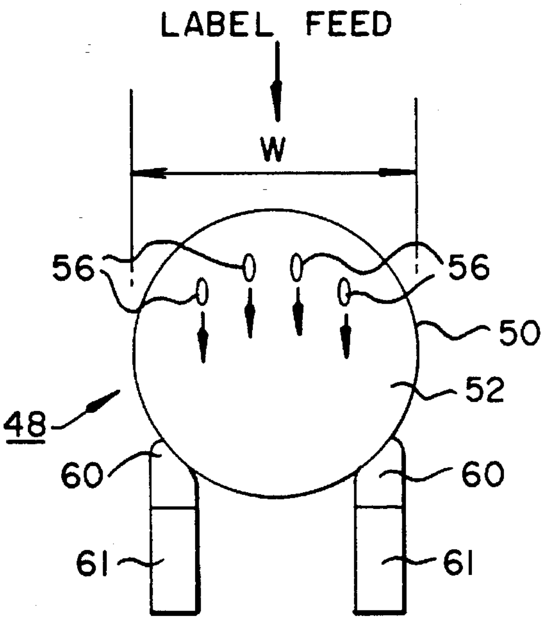

FIGS. 11 and 12 illustrate typical arrays of bores 56 for labeller heads 48 of FIGS. 6 to 10, having flat support surfaces 52 approximately 0.6 and 1.0 inch (1.52 and 2.54 cm), respectively, in width W. The number of bores depends upon the area and weight of the label. The arrows indicate the direction of the jets from bores 56 toward stops 60, preferably so that no vector component of any jet will oppose movement of label 14 onto support surface 52. For round labels, the jets preferably are symmetrically placed relative to the path of the label. Thus, round labels upon release will move across support surface 52 into accurate engagement with stops 60. Similar arrays of bores may be used for labels of other shapes.

Figure 13:
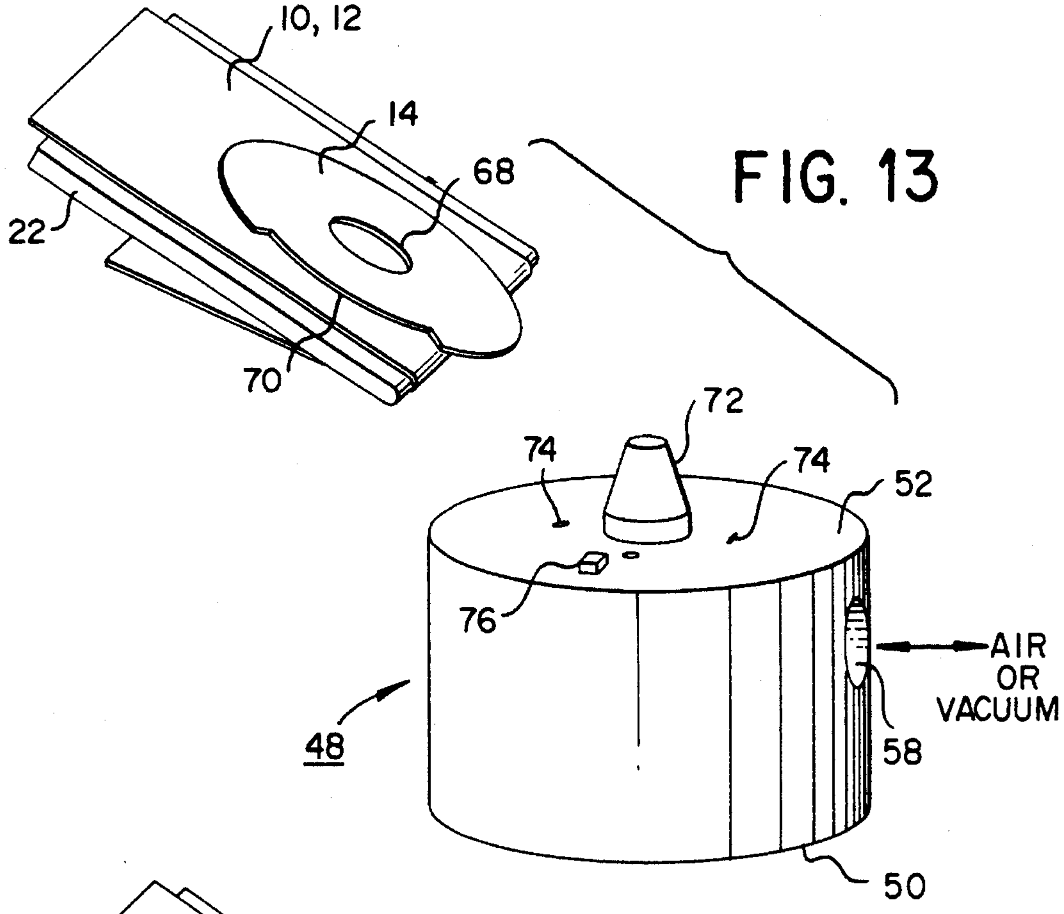
FIG. 13 to 16 show perspective views, some in section, of a fourth embodiment of the labeller head according to the invention.
Figure 14:
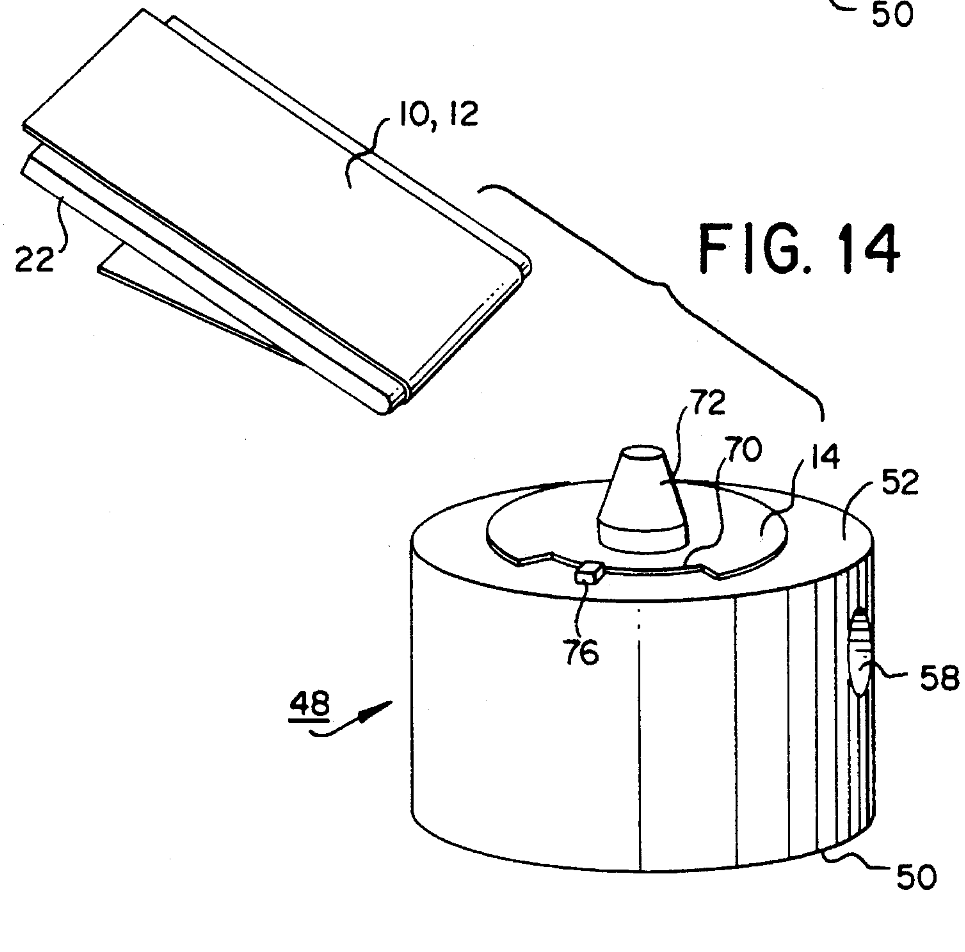
Figure 15:
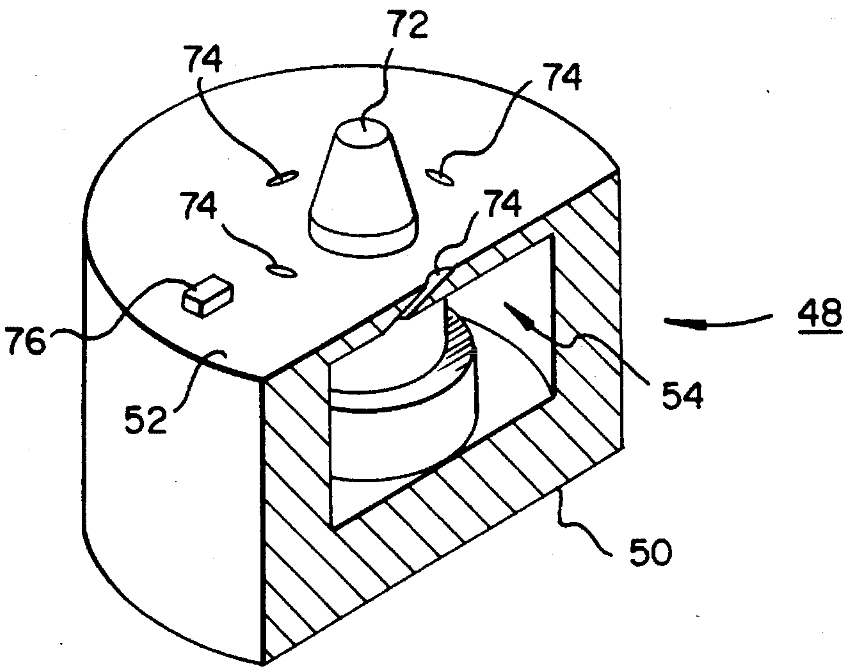
Figure 16:
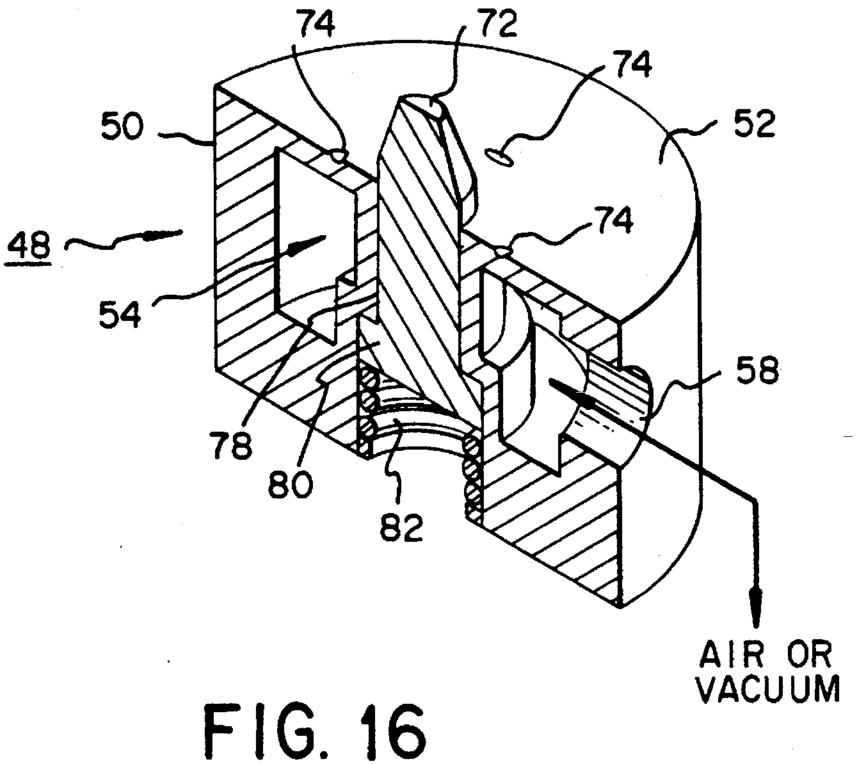

FIGS. 13 to 16 illustrate a fourth embodiment of the invention which is suited for applying labels 14 having a central aperture 68 and a radially inwardly extending feature such as a notch 70 extending over an arc of the circumference of the label. In this case, body 50 is provided with a centrally positioned, tapered locator pin 72 which extends from support surface 52. The diameter of locator pin 72 preferably is only slightly smaller than that of central aperture 68, to accurately center the label on the labeller head. Surrounding locator pin 72 is an array of angled bores 74 whose jets extend in generally the same sense or circular direction about locator pin 72. When label 14 is released so that locator pin 72 enters aperture 68, the label will move down onto and spin around locator pin 72 until notch 70 settles over an axially extending stop or abutment 76, thereby stopping movement of the label and accurately centering and angularly positioning it for application. As shown in FIG. 13, in the embodiment of FIGS. 13 to 16, label 14 covers the portion of the array of bores 74 which are at least partially directed toward stop 76, when the label is positioned against the stop. Thus, the circumferential edge of the label is no subjected to air flows which could dislodge it from its position against the stop. Preferably abutment 76 is retractable during application of the label, not illustrated. As shown in FIGS. 15 and 16, body 50 comprises a central stepped bore 72 surrounded by plenum 54, in which locator pin 72 is slidably mounted. A head 80 on the locator pin is pressed against by a spring 82; so that, locator pin 72 is retractable but is biased to extend beyond support surface 52 as illustrated. As will be discussed further with respect to FIG. 20, the retractability of locator pin 72 facilitates use of labeller head 48 to accurately place label 14 around a bore in the article to be labelled. Preferably, subatmospheric pressure is applied to plenum 54 after the label has been acquired and repositioned and is released when the label is pressed or blown onto the article to be labelled.

FIGS. 17 to 21 illustrate a fifth embodiment of the invention which also is suited for applying labels having a central aperture 68 and a peripheral notch 70. In this instance, locator pin 72 can be withdrawn below support surface 52 by any convenient means such as a solenoid or air cylinder (not illustrated), to permit label 14 to be presented and accurately positioned in a different manner. Thus, the diameter of locator pin 72 can be substantially less than that of aperture 68. To facilitate adjustment of the lateral positions of stops 60 and to allow the stops to be depressed to the level of support surface 52, support surface 52 preferably ends at a recess having an edge 84 which along a portion of its length is shaped geometrically similarly to the portion of label 14 comprising notch 70. Opposite this portion of edge 84 and extended over the recess are stops 60, laterally positioned so that the first stop can engage one side of notch 70 and the second stop can engage the periphery of label 14 on the opposite side of notch 70 from the first stop, as seen most clearly in FIG. 17 or FIG. 20. The label is presented to support surface 52 along a path directly toward stops 60.

Figure 17:
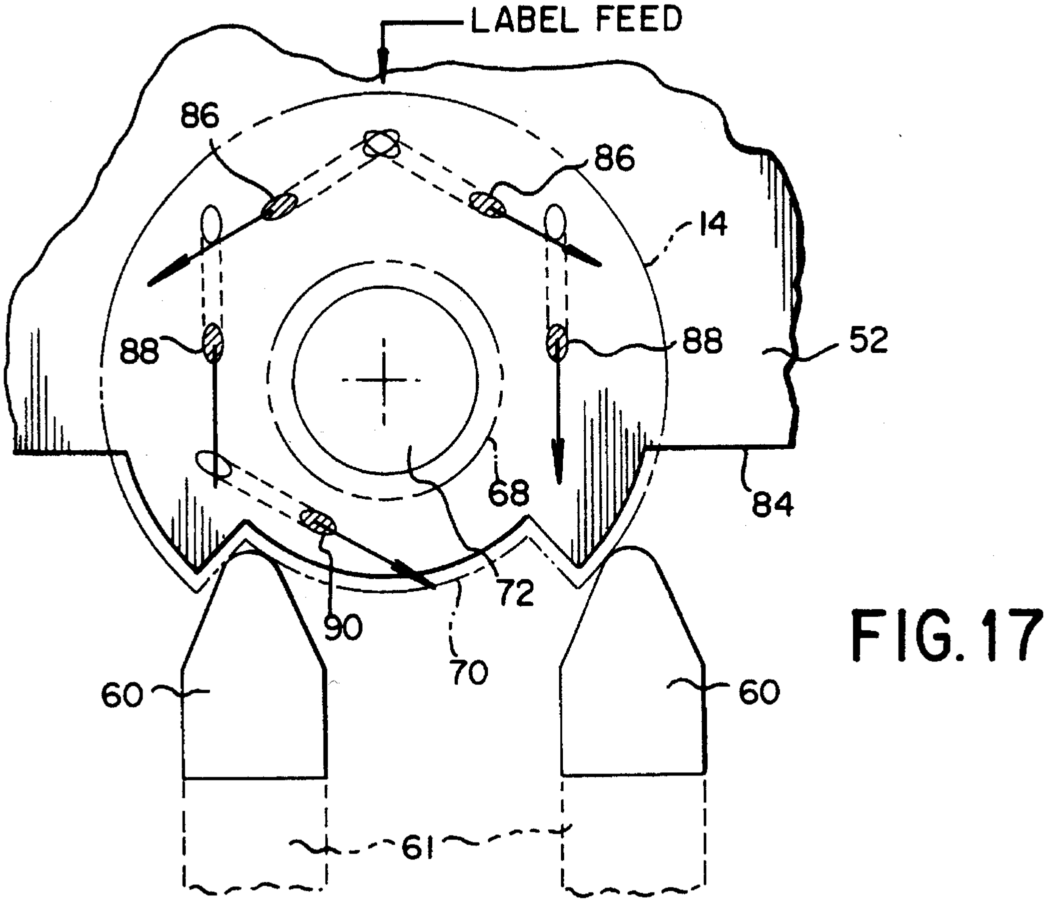
FIG. 17 shows a plan view and FIGS. 18 to 21 show perspective views, some in section, of a fifth embodiment of the labeller head according to the invention.
Figure 18:
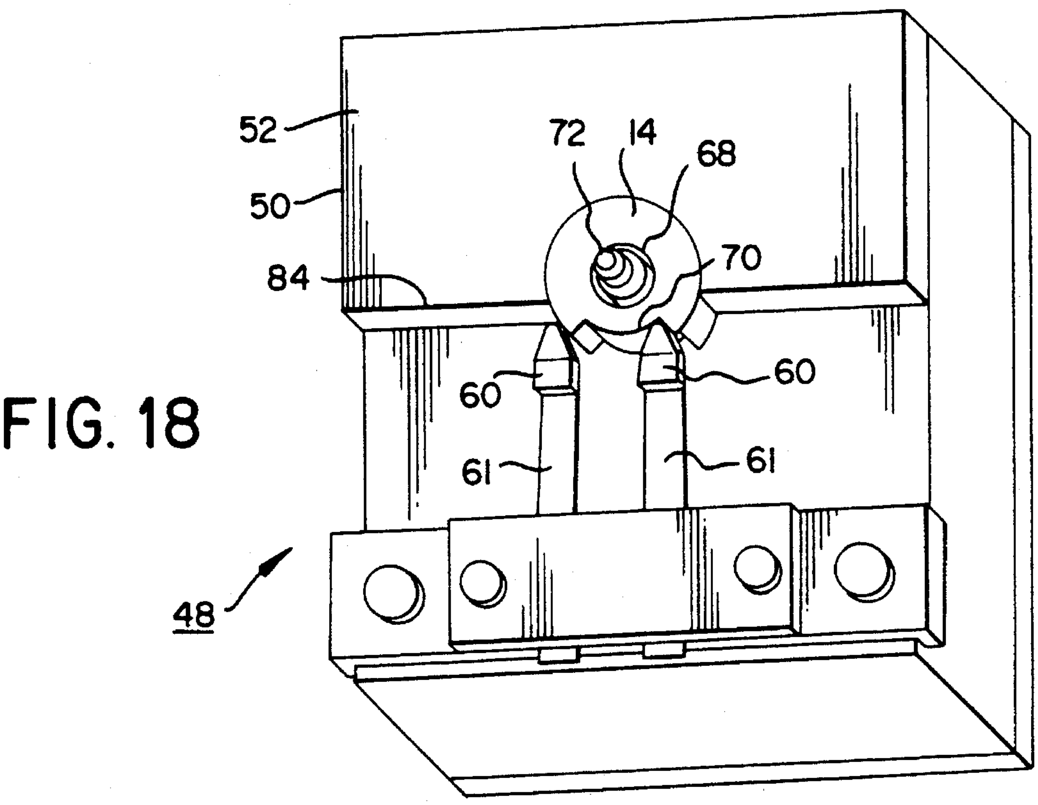
Figure 19:
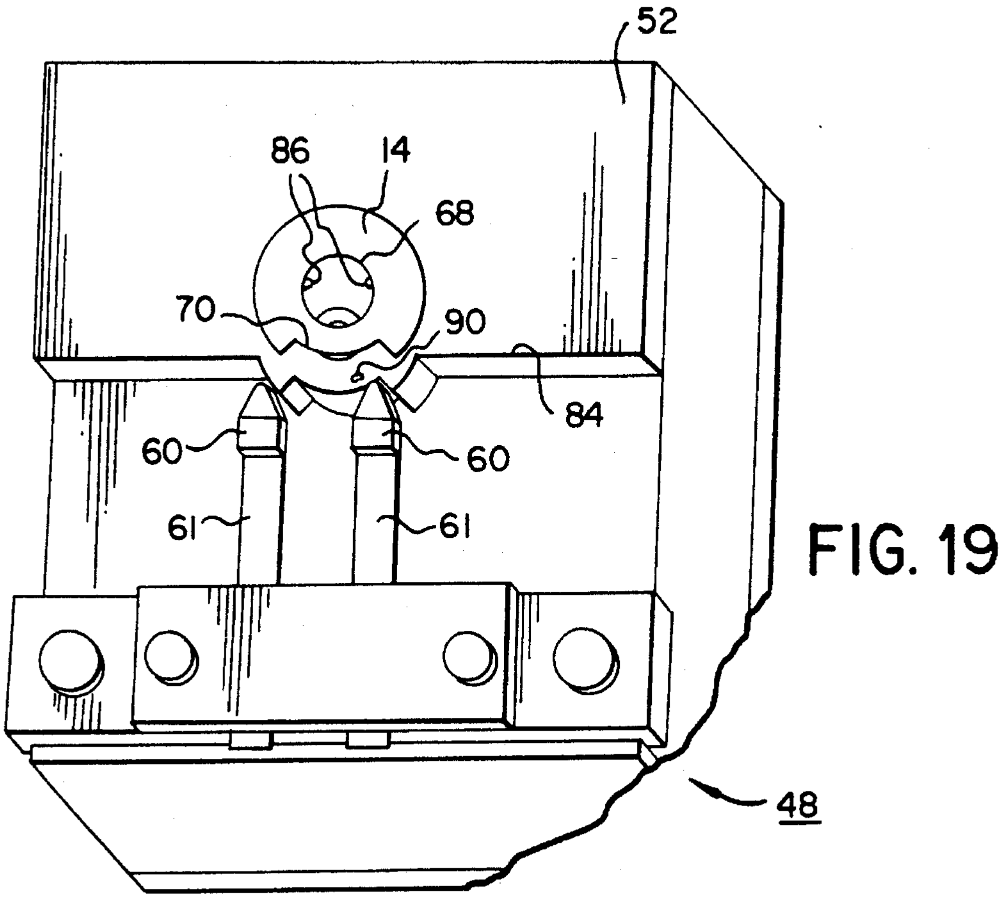
Figure 20:
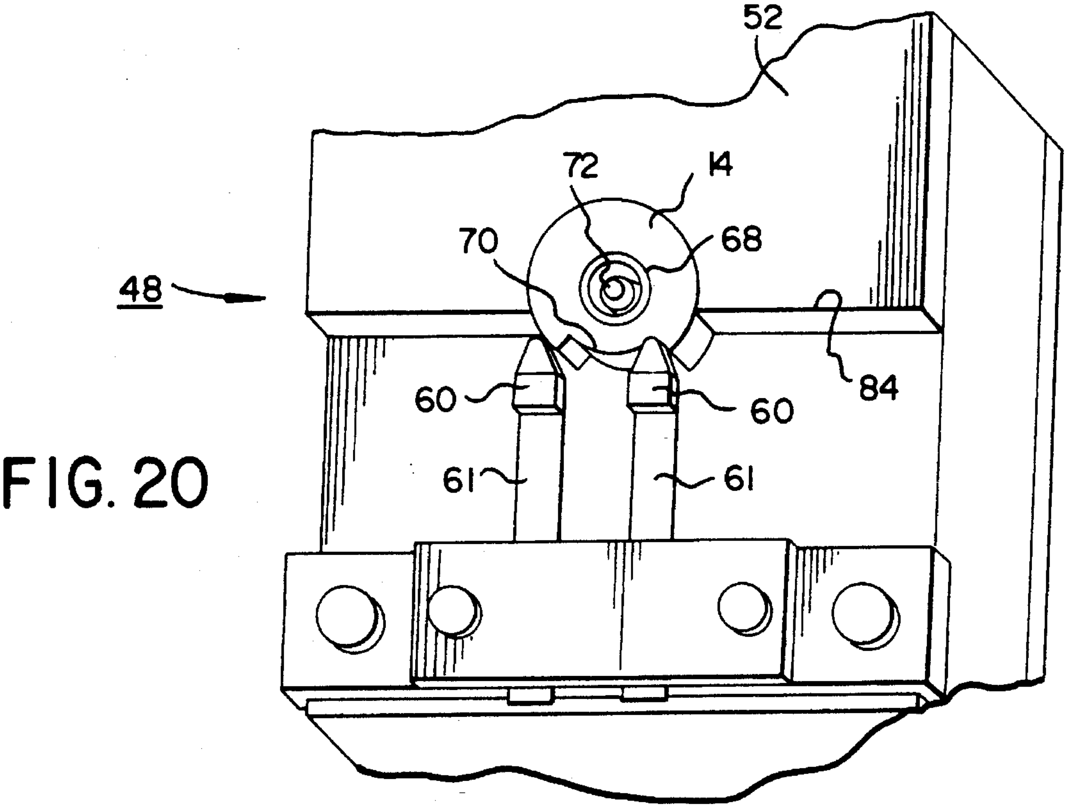

Rather than the circular array of jets of the embodiment of FIGS. 13 to 16, a first pair of jets 86 are provided on the opposite side of locator pin 72 from stops 60 and are directed at angles toward opposite sides of locator pin 72; a second pair of jets 88 are directed directly toward stops 60 on opposite sides of locator pin 72; and a single, angular orientation jet 90 nearest stops 60 is directed at an angle toward the more distant of stops 60. Jet 90 may be positioned on either side of the path of label 14. In accordance with the invention, preferably none of the jets includes a vector force component which would oppose movement of the label across support surface 52. Support surface 52 preferably is flat but also may have a cylindrical, convex shape of the type shown in FIGS. 8 and 9. With this arrangement, once locator pin 72 has been withdrawn, a label presented in the direction shown will be moved by jets 86, 88 across support surface 52 toward stops 60 and will be turned by jet 90; so that, stops 60 accurately engage notch 70 and the periphery of the label. Locator pin 72 can then be extended through central aperture 68. As shown in FIGS. 17 and 20, in the embodiment of FIGS. 17 to 21 label 14 covers the portion of the array of bores 86, 88, 90 which are at least partially directed toward stops 60, when the label is positioned against the stops. Thus, the circumferential edge of the label is not subjected to air flows which could dislodge it from its position against the stops. While the arrangement of FIG. 17 is well suited for use with labels having an aperture 68 and notch 70, those skilled in the art will appreciate that labels without apertures and of different shapes may be acquired and repositioned using somewhat different arrays of jets and stops, without departing from the scope of the invention.

Figure 21:
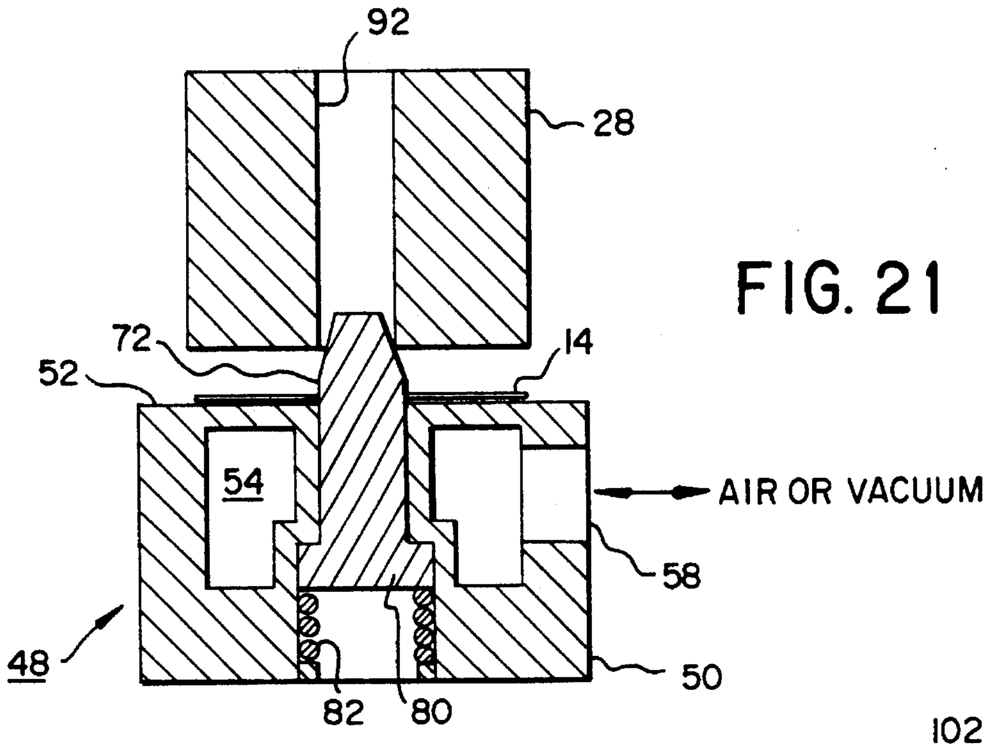

With the label accurately positioned on labeller head 48, it can be applied to an article 28 in the manner shown in FIG. 21. Article 28 has a bore 92 or other pilot feature about which label 14 is to be accurately positioned. The labeller head is moved toward article 28, or vice versa, to permit locator pin 72, which preferably is tapered as illustrated, to enter bore 92. The taper on locator pin 72 can be used to finely position article 28 coaxially with the labeller head. Then, as the labeller head is moved into close proximity with the article, locator pin 72 engages bore 92 and retracts against the force of spring 82; so that, label 14 is accurately applied about bore 92.

Figure 22:
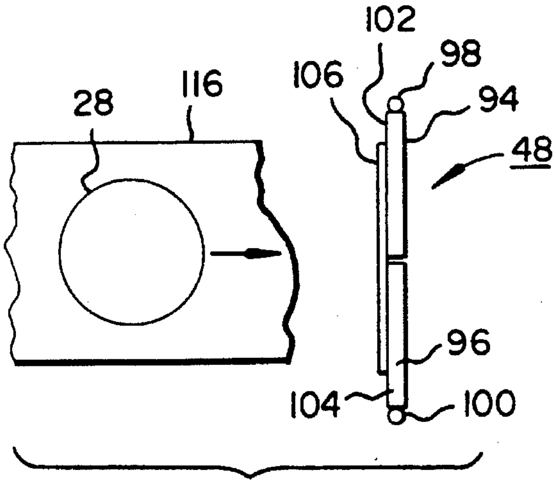
FIG. 22 PRIOR ART
FIGS. 22 to 24 show schematically still another known type of labeller apparatus with pivoting supports for the label.
Figure 23:
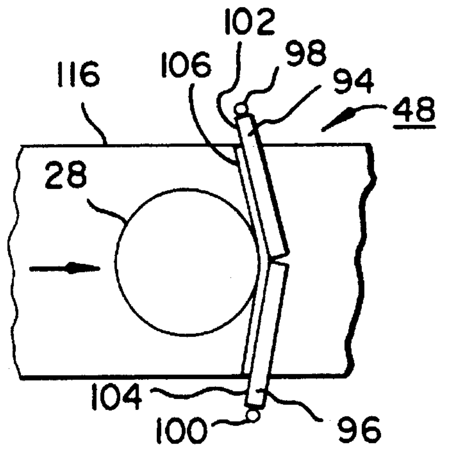
FIG. 23 PRIOR ART
Figure 24:
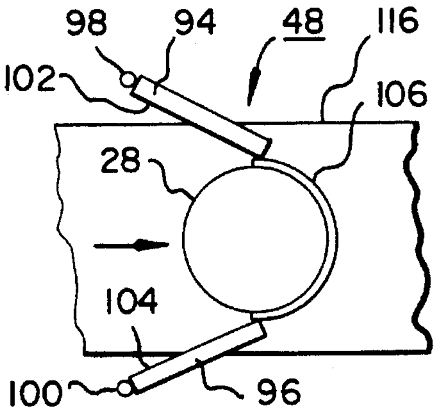
FIG. 24 PRIOR ART
Figure 25:
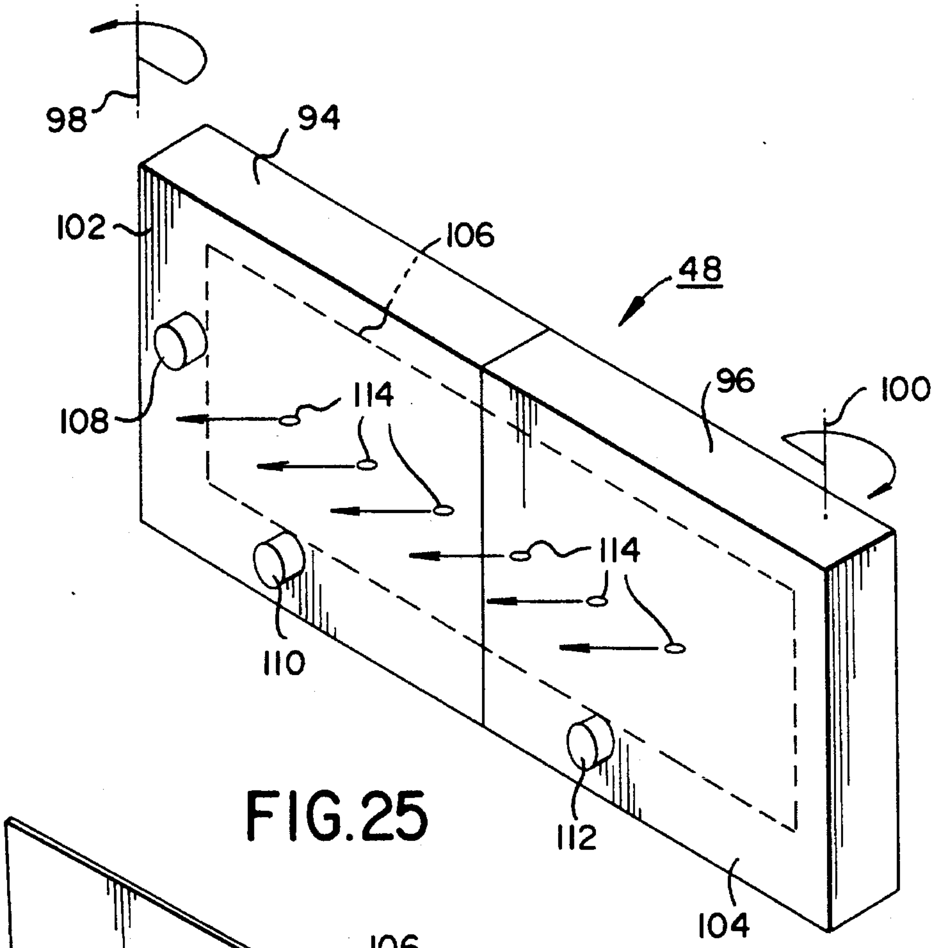
FIGS. 25 and 26 show perspective views of a sixth embodiment of the labeller head according to the invention.
Figure 26:
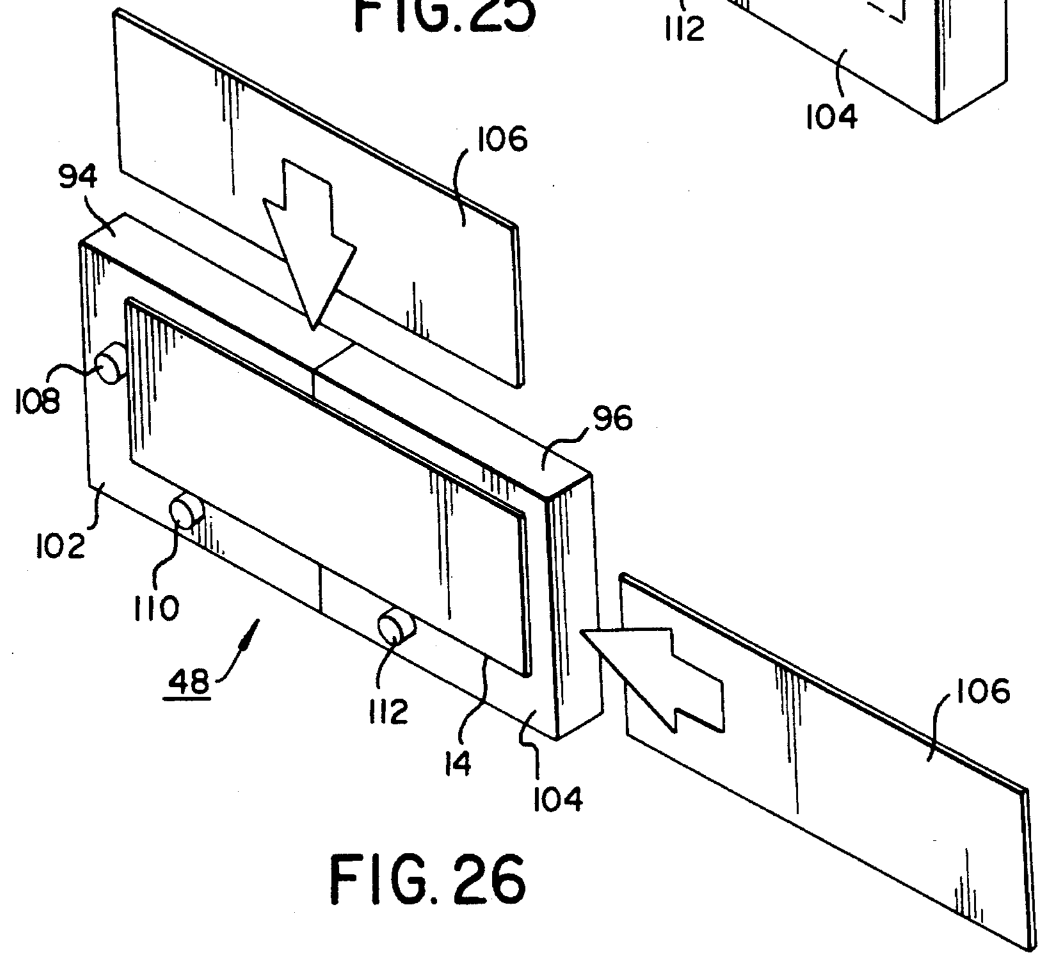

FIGS. 22 to 24 illustrate schematically a known type of labeller apparatus which is improved by the sixth embodiment of the invention shown in FIGS. 25 and 26. In the known apparatus, a pair of fiat vacuum support members 94, 96 are pivotably supported at 98, 100 to permit the support members to swing back and forth, rather like saloon doors. Each support member comprises an essentially rectangular support surface 102, 104 on which a label 106 can be held by vacuum with its adhesive side facing an article 28 moving toward the label on a suitable product nest or conveyor 116. Thus, as the article encounters the label, the support members swing open to permit the article to pass, thereby allowing the label to slip off the support members and at least partially wrap around the article. In accordance with the invention as shown in FIGS. 25 and 26, support members 94, 96 am Bernoulli Effect labelling heads and provided with an array of edge stops 108, 110, 112 which, in the illustrated embodiment, are positioned on the two support members to engage orthogonal edges of a rectangular label 106. An interior plenum, not illustrated, is provided within each of support members 94, 96 and communicates in the manner previously described with a plurality of angled bores 114 which are arranged in a linear army and angled to provide jets of gas which urge a rectangular label 106 across support surfaces 102, 104 into contact with edge stops 108, 110, 112. As shown in FIGS. 25 and 26, in this embodiment label 106 covers the portion of the array of bores 114 which are at least partially directed toward stops 108, 110, 112, when the label is positioned against the stops. Thus, the rear or upstream edges of the label are not subjected to air flows which could dislodge it from its position against the stops. As indicated in FIG. 26, label 106 may be presented from any direction along the support surfaces toward the edge stops. Rather than the simple cylindrical stops 108, 110, 112 shown in FIGS. 25 and 26, straight sided stop walls, not illustrated, may be used which replace the cylindrical stops and extend along the length and breadth of surfaces 102, 104 to contact a substantial portion of the leading edges of the label. Preferably, support surfaces 102, 104 are flat; but they may also have a cylindrical convex shape with an axis of curvature transverse to the direction of label feed, to help establish an initial line contact with the article to be labelled.

While my invention has been shown and described with reference to particular embodiments thereof, those skilled in the art will understand that other variations in form and detail may be made without departing from the scope and spirit of my invention.

Having thus described my invention in sufficient detail to enable those skilled in the art to make and use it, I claim as new and desire to seem Letters Patent for:

1. A method of applying to an article a thin, flexible, pressure sensitive label of the type having a first, display side and a second, adhesive side opposite said first, display side, said method comprising the steps of:

providing a body having a support surface, a plenum within the body and a plurality of bores extended from said plenum through said support surface, said bores being angled with respect to said support surface and arranged in an array so that jets of gas issuing from said array will cause said label to be drawn toward and across said support surface when said label is presented to said support surface and said first, display side is brought into close proximity of said jets, thereby causing a zone of reduced gas pressure to be formed between said support surface and said first, display side and establishing a pressure differential across said label to hold said label on a thin film of gas flowing between said support surface and said first, display side;

directing gas through said bores to form said jets;

presenting at least a portion of one of said labels along a path of movement across said support surface to permit said jets to engage said first, display side and draw said label toward and across said support surface;

releasing said label to enable said label to move with said film of gas across said support surface;

stopping movement of said label across said support surface against at least one stop abutment, at least a portion of said jets issuing from said bores at least partially toward said stop abutment w cause said label, after said releasing, to reposition from said path of movement against said abutment, all of said portion of said jets being covered by said label when said label is positioned against said abutment;

holding said label on said film of gas at said abutment in a position for accurate application to an article to be labeled; and moving said body into close proximity to said article, thereby pressing said second, adhesive side against said article to apply said label.

2. A method according to claim 1, wherein said directing step takes place after said presenting step.

3. A method according to claim 1, wherein said body comprises a second plenum within said body and a second plurality of bores extended from said second plenum through said suppose surface further comprising a step of directing gas through said second plurality of bores to blow said second, adhesive side into contact with said article.

4. A method according to claim 3, further comprising the steps, after said directing step, of applying vacuum to said angled bores to hold said label to said support surface; and after said moving step, applying pressurized gas to said second plurality of bores to blow said label against said article.

5. A method according to claim 3, further comprising the steps, after said directing step, of applying vacuum to said second plurality of bores to hold said label to said support surface; and after said moving step, applying pressurized gas to said second plurality of bores to blow said label against said article.

* * * * *

UNITED STATES PATENT AND TRADEMARK OFFICE

CERTIFICATE OF CORRECTION

PATENT NO. : 5,472,543

DATED : December 5, 1995

INVENTOR(S) : Joseph E. Yokajty

It is certified that error appears in the above-indentified patent and that said Letters Patent is hereby corrected as shown below:

On the title page, item [75], delete "Yokajity" and insert -- Yokajty --

Signed and Sealed this

Fourteenth Day of October, 1997

Attest:

BRUCE LEHMAN

Attesting Officer

*Commissioner of Patents and Trademarks*